(No Model.)
C. M. FAIRBANKS.
PROCESS OF MAKING FILES.
No. 365,249. Patented June 21, 1887.
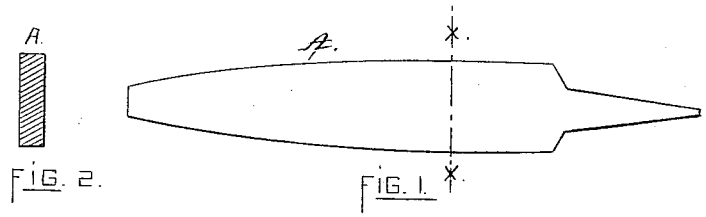
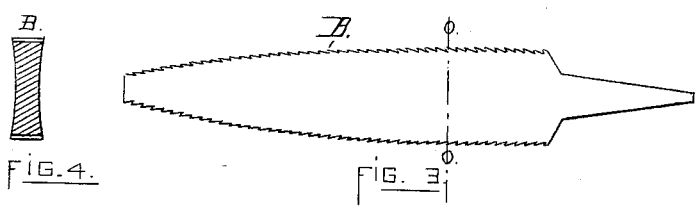
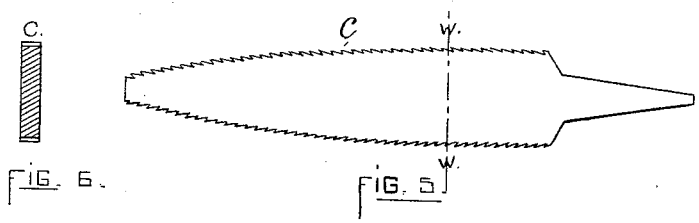
WITNESSES. INVENTOR.

UNITED STATES PATENT OFFICE.

CRAWFORD M. FAIRBANKS, OF LINCOLN, RHODE ISLAND.

PROCESS OF MAKING FILES.

SPECIFICATION forming part of Letters Patent No. 365,249, dated June 21, 1887.

Application filed March 7, 1887. Serial No. 229,970. (No model.)

*To all whom it may concern:*

Be it known that I, CRAWFORD M. FAIRBANKS, of Lincoln, in the county of Providence and State of Rhode Island, have made certain new and useful Improvements in the Process of Making Files; and I do hereby declare that the following specification, taken in connection with the drawings, making a part of the same, is a full, clear, and exact description thereof.

Figure 1 is a view of a file blank prepared for cutting. Fig. 2 is a cross-section of same on line $x\ x$. Fig. 3 is a view of the blank with the edges cut. Fig. 4 is a cross-section of same on line $o\ o$. Fig. 5 is a view of the blank after it has been passed through rollers. Fig. 6 is a cross-section of same on line $w\ w$.

The object of my invention is to simplify, improve, and quicken the method of making files, so that the same may be produced more cheaply than they are at present manufactured; and it consists in the process hereinafter described.

In the manufacture of flat files, to which my invention refers, the edges and sides are usually prepared for cutting in the first instance and the teeth cut upon the edges and sides in the order named. The cutting of the edges first has a tendency to spread the blank, and also to leave a projecting or overhanging burr, one of which must be corrected and the other removed before the face cutting can be proceeded with.

The means heretofore employed to re-form or straighten the blank and remove the burr have been to strip with a file or "draw up" by hand or upon a grindstone, all of which requires much time and labor.

In my invention I first grind the blank A, Figs. 1 and 2, all over and then cut the edges B, Figs. 3 and 4, after which I pass the blank through suitable rollers, which at the same time straighten the faces and reduce the burr C, Figs. 5 and 6, and finally cut the sides thereof. This process results in a material saving of time and consequently reduces the cost of the file for the reason that a considerable number can be acted upon by the rollers while a single blank can be prepared by the other methods.

What I claim as my invention, and desire to secure by Letters Patent, is—

The process of making flat files herein described, consisting in grinding the blank upon the sides and edges, and after cutting the edges passing the blank through rollers, and subsequently cutting the sides, as specified.

CRAWFORD M. FAIRBANKS.

Witnesses:
    C. PERRY WHITE,
    WALTER B. VINCENT.